G. C. REITH & G. F. FLADE.
COIN SELECTOR.
APPLICATION FILED AUG. 30, 1909.

1,038,655.

Patented Sept. 17, 1912.

Witnesses.—
Wills A. Burrowes
Walter A. Pullinger

Inventors.—
George C. Reith.
George F. Flade.
by their Attorneys.
Howson & Howson

G. C. REITH & G. F. FLADE.
COIN SELECTOR.
APPLICATION FILED AUG. 30, 1909.

1,038,655.

Patented Sept. 17, 1912.

G. C. REITH & G. F. FLADE.
COIN SELECTOR.
APPLICATION FILED AUG. 30, 1909.

1,038,655.

Patented Sept. 17, 1912.

Witnesses:
Willa A. Burrows
Walter Pullinger

Inventors
George C. Reith.
George F. Flade.
by their Attorneys
Howson & Howson

G. C. REITH & G. F. FLADE.
COIN SELECTOR.
APPLICATION FILED AUG. 30, 1909.

1,038,655.

Patented Sept. 17, 1912.

Witnesses.
Inventors George C. Reith.
George F. Flade.
by their Attorneys.
Howson & Howson

UNITED STATES PATENT OFFICE.

GEORGE C. REITH AND GEORGE F. FLADE, OF PHILADELPHIA, PENNSYLVANIA, ASSIGNORS TO EDWARD F. HENSON, TRUSTEE, OF PHILADELPHIA, PENNSYLVANIA.

COIN-SELECTOR.

1,038,655.  Specification of Letters Patent.  Patented Sept. 17, 1912.

Application filed August 30, 1909. Serial No. 515,215.

*To all whom it may concern:*

Be it known that we, GEORGE C. REITH and GEORGE F. FLADE, both citizens of the United States, residing in Philadelphia, Pennsylvania, have invented certain Improvements in Coin-Selectors, of which the following is a specification.

Our invention relates to that class of apparatus particularly designed for attachment to or use in connection with vending machines, for the purpose of detecting and automatically rejecting coins, slugs, or tokens other than those of the standard dimension and denomination which it is designed to pass.

One object of the invention is to provide a machine of the general class noted, in which the means for operating the valve or other coin directing device, shall be electrically controlled, in the present instance an electromagnet whose energization is dependent upon the completion of its circuit by the closing of a number of switches. These latter are in turn controlled by members whose positions, under operating conditions, are dependent upon the thickness of the coin at various points or upon the depths of the different impressions in one or both of its faces, so that if said coin is of standard size and value it causes certain contacts or switches to be closed and causes others to be left closed, thereby permitting current to flow to the valve-controlling magnet or such other device as may be employed to direct or determine the course of the coin through the machine.

It is further desired to provide a device of the general character above noted which shall be certain in action, not likely to get out of order, and of such simplicity and arrangement of parts as will permit of its convenient attachment to the various types of machine without requiring their material change or necessitating any considerable outlay for its application to them.

These objects and other advantageous ends we secure as hereinafter set forth, reference being had to the accompanying drawings, in which:—

Figures 7, 8, 9:
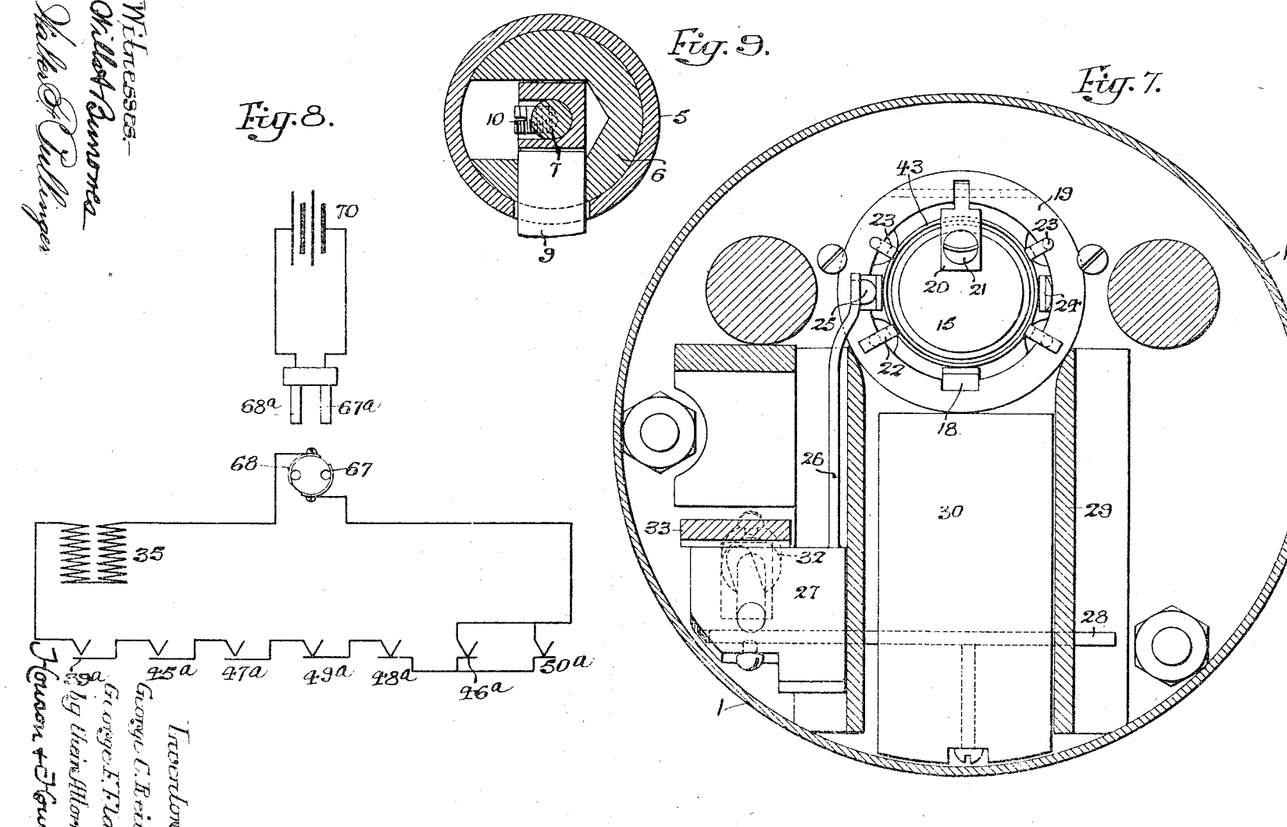
Fig. 7, is a vertical section also on the line *a—a*, Fig. 2, looking in the direction opposite from that of Fig. 5.
Fig. 8, is a diagrammatic view of the electrical connections of the switches, electro-magnet and their associated apparatus as employed in our machine.
Fig. 9, is a vertical section on the line *c—c*, Fig. 2.

In the above drawings, 1 represents a cylindrical casing having a front head 2 and a rear head 3, as well as a centrally placed transverse partition 4. Extending between this partition and the head 2 is a guide way 5 in which is slidably mounted a plunger 6, designed to be actuated by a rod 7 extending through the head 2 and provided with a knob or handle 8 whereby it may be moved longitudinally inward. Such inward motion is opposed and the plunger is returned to its normal position after being moved inwardly, by a spring 9 attached to the partition 4. The front end of said spring projects through the guideway 5 into a suitable slot of a plug 9ª fitting the plunger 6 and bored to permit of the passage of the rod 7. The movement of this latter relatively to the plunger is limited by a set screw 10, as shown in Fig. 9, and it is operatively connected to said plunger through a spring 11 confined between the bottom of a recess in the front end of the plunger and a collar 12 fastened to said rod 7. The rear end of this rod terminates within the plunger, which, however, is constructed to receive at its rear end what is in effect a continuation of the rod 7, and indicated at 13. A spring 14 is interposed between the front end of this part 13 and the end of said rod, and said part carries at its rear end a flat disk 15 designed to engage the central or main portion of the face of each coin operated on. Said disk normally terminates at a distance in front of the partition 4 a little greater than the thickness of the coin for which the machine is designed, and there is provided a piece 16 shaped to co-act with the portion of the partition at the rear end of the guide 5, to form a channel or passageway for directing a coin from the slot 17 through which it is introduced into the casing 1, to a position in front of the disk 15.

Figure 2:
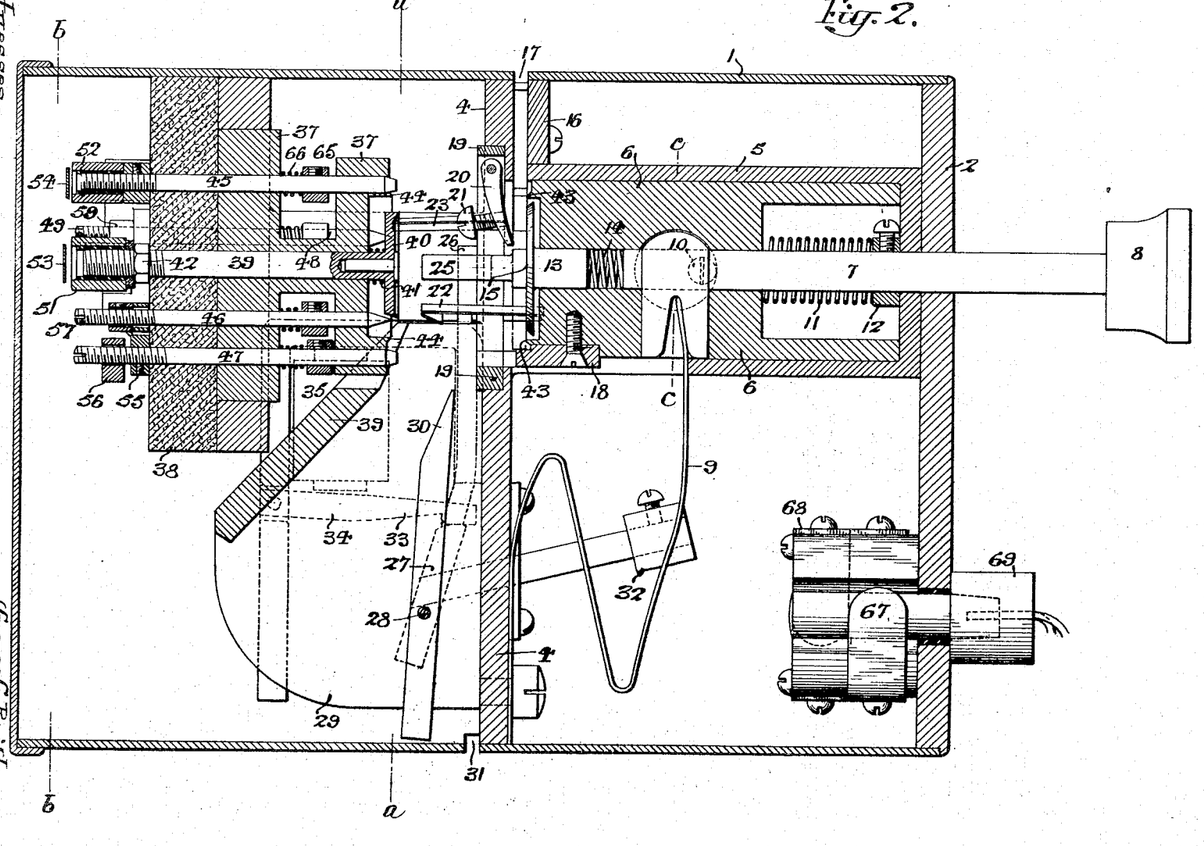
Fig. 2, is a vertical section on an enlarged scale illustrating the detail construction of the machine.
Figure 4:
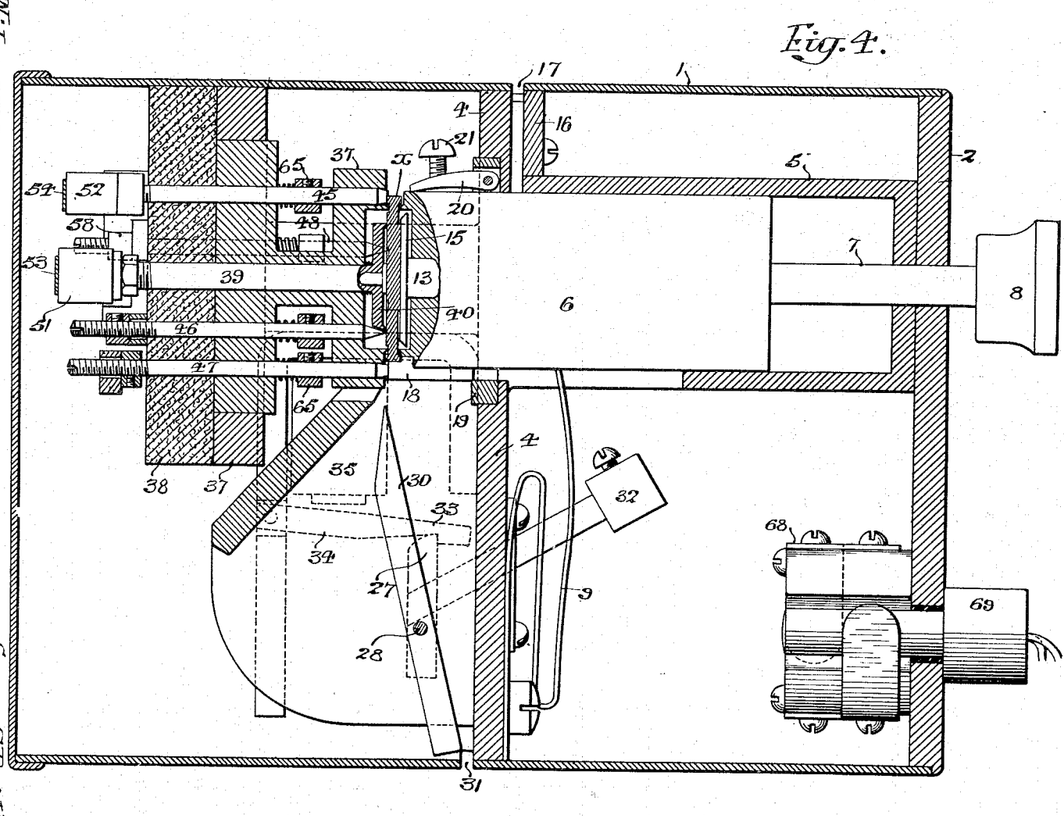
Fig. 4, is a vertical section similar to Fig. 2, showing the various parts in the positions occupied when a coin has been delivered to the machine and the operating plunger has been pushed inward.
Figure 5:
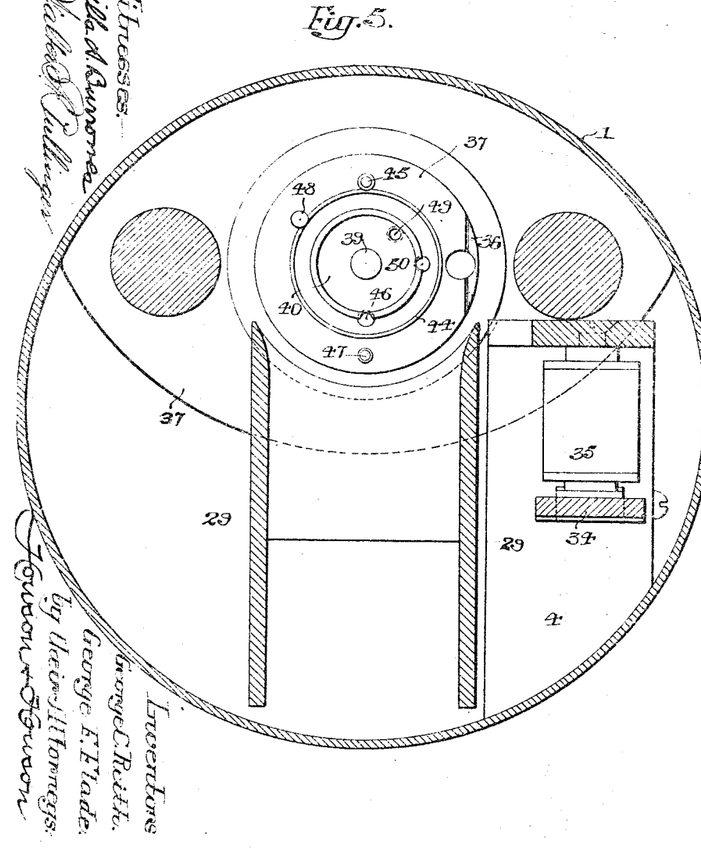
Figs. 5 and 6 are vertical sections on the lines *a—a* and *b—b*, Fig. 2.
Figure 6:
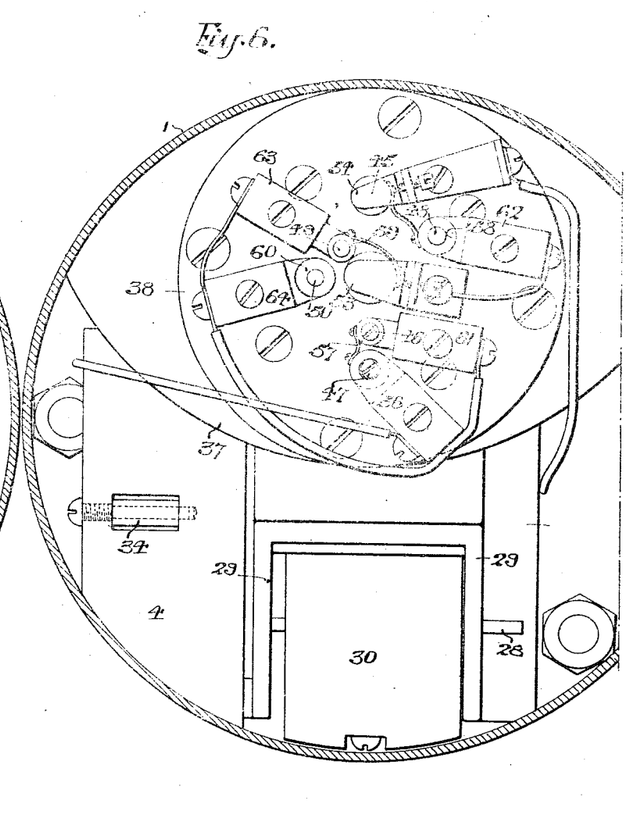

For supporting the coin immediately in front of said disk, we provide a piece 18 of rectangular section, attached to the lower rear portion of said plunger 6 and projecting rearwardly beyond the plane of said disk. A ring 19 is mounted on the rear face of the partition and has pivoted to its topmost part a depending guide latch 20 whose lower end is weighted, in the present instance by means of a screw 21, so that as shown in Fig. 2, it normally hangs in a position with its lower end inclined toward the front of the machine. Said end thus normally lies in the plane of the front surface of the partition 4 so as to rest against the rear face of a coin in order to prevent it from falling rearwardly from a vertical position immediately after its introduction into the machine. There are also attached to the ring 19 four rearwardly extending spring guides, of which the lower pair is indicated at 22 and the upper pair at 23. Of these, the lower pair extends both in front and to the rear of the ring so as to assist in centering the coin in front of the disk 15, while the upper pair extends rearwardly from the ring with the same object in view. On opposite sides of the rear part of the plunger 6 are mounted two other guide-bars 24 and 25 so arranged that their inner surfaces are practically tangent to the circle of the coin so as to also assist in centering it, the bar 25 being prolonged rearwardly and provided with an offset so that when the plunger is moved in, it will engage and turn on its pivot a lever 26. Said lever at its lower end is in the form of or is attached to a plate 27 mounted upon and fixed to a horizontal pin 28 revolubly carried in bearings in the sides of a structure 29 which forms part of the coin chute. Between these two sides and directly to the rear of the partition 4 is the valve or coin-directing member 30 which is supported by and fixed to the spindle 28 as shown in Fig. 7; the arrangement being such that when the rod 7 is pushed inwardly, the parts 13 and 25 are also moved to the rear so that the offset portion of the latter part engages the lever arm 26 and swings it, together with the valve 30, into the position shown in Fig. 4, so that said valve will direct a coin out of an opening 31 in the bottom of the case 1 as being worthless or of dimensions or value other than the standard. There is also attached to the valve 30, in the present instance through the plate 27, a weight 32 which acts at all times to maintain the valve 30 in or return it to, the position shown in Fig. 2. When, however, said valve has been moved into its second position, as in Fig. 4, the plate 27 is engaged by a catch 33 connected to the armature 34 of an electro-magnet 35 supported in any suitable manner within the casing; the arrangement and construction being such that when the magnet is energized, the armature, and with it the catch, are so raised as to release the plate and permit it, under the action of the weight 32, to return to its normal position. Such action is rendered possible by reason of the fact that just as the catch engages the plate 27 when the lever arm 26 has been swung fully to the rear, said lever arm is disengaged from the offset spring member 25 by reason of the fact that this engages a cam surface 36 (Fig. 5) formed on a casting or other suitable supporting structure 37 carried in the rear half of the casing 1 in any suitable manner.

It is obvious that with the valve 30 in the position shown in Fig. 2, any coin dropped from the supporting members 18 and 22 would be directed into the rear portion of the casing so as to be retained by the machine. The structure 37 in the present instance forms part of the casting constituting the partition 4 and the structure 29, and it carries a block 38 of segmental shape which with it serves as a support and guide for a number of longitudinally movable metallic rods or pins designed to operate a number of electric switches under operating conditions. One of these rods 39 is mounted with its axis concentric with the disk 15, and it is provided with a disk shaped head 40 having a sharp forwardly projecting edge. This rod, with said head, is normally maintained in a forwardly projected position slightly beyond the front of the structure 37 by a spring 41 confined between it and said support, and its movement is limited by a nut or head 42 on its opposite end. The rear face of the plunger 6 is also provided with a sharp rearwardly projecting knife edge 43 concentric with the disk 15. The front face of the structure 37 is recessed for the reception of the disk 40, and the inner edge of said recess has a sharp forwardly projecting edge indicated at 44, so that both it and the edge 43 may fit within the flange or raised edge of a coin and engage the lowest portion of the surface thereof.

Parallel with the rod 39 and also projecting forwardly from the front face of the structure 37 are a number of longitudinally movable rods indicated at 45 to 50 inclusive, of which those indicated at 45 and 47 are relatively blunt at their forward ends and are designed to respectively engage the flange or raised edge of a coin, and the piece 18, under operating conditions hereafter noted. The remainder of the rods are provided with sharpened points and are so placed as to strike the various portions of the figures, printing and impressions on the faces of the coin for which the machine is designed. It is to be understood that the number and placing of these points may be widely varied without departing from the present invention, although in the case illustrated, I have shown one of the points, as 48, in a position to engage the lettering or wreath found in the upper portions of a cent. Two others of the points;—viz, 46 and 50, are placed at the same distance from the center line of the rod 39 and are so spaced from each other that while one of them may be engaged by a portion of the figure head or lettering on the coin, the other will certainly strike the lowest portion of the coin surface.

The point 49 is so placed as to certainly strike the raised portion of the figure head or central lettering of the coin and each of the points is provided at its rear end with threads and an adjustable nut or collar, so that its position may be longitudinally varied with the utmost nicety. In the present instance, the rods 39 and 45 have mounted on their rear ends metallic collars 51 and 52, which are insulated from them but are capable, when their respective rods have been moved to the rear a predetermined distance, of electrically engaging spring contact plates 53 and 54 suitably carried on the fiber supporting block 38. The rod 47 has fixed to and in electrical connection with it a metallic collar 55 which, when said rod has been moved to the rear to a limited extent, comes into engagement with a contact piece 56. Similarly, the rods 46, 48, 49, and 50 have mounted on them metallic collars 57, 58, 59 and 60 which are insulated from them but are normally in electrical engagement with fixed contacts 61, 62, 63 and 64, preferably mounted upon the fiber block 38. It is evident that the slightest longitudinal movement of any one of these four rods will break the electrical connection between the collar which is mounted on it and the fixed contact which coöperates with said collar, and in order that the various rods may be normally projected forward as far as is permissible, we mount on each of them, as well as on the rods 47 and 45, a collar 65, between which and the structure 37 we place a spring 56.

Within the casing 1 at any convenient point is mounted a pair of plug contacts of which one is shown at 67 and the other, indicated at 68, Fig. 8, is adjacent to suitable holes in the casing for the reception of a two-pole contact plug 69 whereby current from any suitable source may be conducted to the device. The various contacts are connected to each other, to the contacts 67 and 68, and to the electro-magnet 35, in the manner indicated in Fig. 8; the various switches formed by the contacts being, as illustrated in said figure, so designed that those of the rods 39, 45, and 47 are normally open, as indicated at 39$^a$, 45$^a$, and 47$^a$, while the remainder of the contacts, or those connected with the rods 46, 48, 49 and 50, are so arranged as to be in a normally closed position as indicated at 46$^a$, 48$^a$, 49$^a$, and 50$^a$. As shown in Fig. 8, all of the various switches formed by the contacts are connected in series, except those indicated at 46$^a$ and 50$^a$, which are connected in multiple, so that although either one of them may be open, the other being closed, will preserve the circuit unbroken.

With the above described arrangement of parts, if a coin be placed in the machine through the opening 17, it immediately falls into position in front of the disk 15, with its lowest portion resting upon the piece 18 and its sides held in position by the guide pieces 22, 23, and 25. It is moreover prevented from falling to the rear by means of the weighted catch 20. A suitable battery, indicated at 70, should be connected to the machine through the plug 69 and the contacts 67 and 68 and in order to operate the machine, the handle 8 is then pushed inwardly. As a result, the disk 15 immediately engages the coin and while preserving it in a vertical position, moves it to the rear until it finally reaches the position indicated at $x$ in Fig. 4; the pivoted latch 20 moving into the position shown in order to permit of such movement. As the guide 25 moves to the rear, it carries with it the lever 26 and valve 30, bringing this latter into the position shown in Fig. 4 just as the catch 33 engages the plate 27 and the cam face 36 causes the guide 25 to disengage said lever. The final inward pressure exerted through the rod 7 and the plunger 6 brings the coin fully into engagement with the disk 40 and with certain of the rods, while one of the rods;—viz. 47, is engaged by the coin-supporting piece 18.

Figures 1, 3:
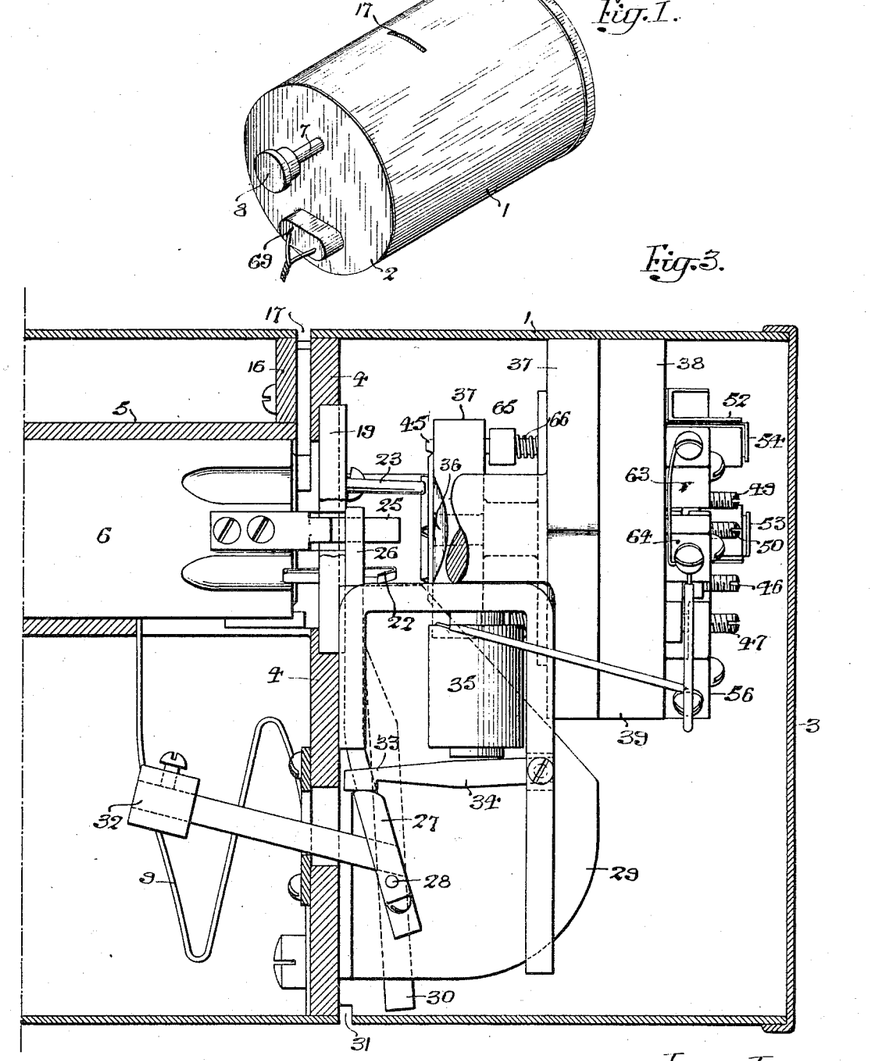
Figure 1, is a perspective view of our device ready for attachment to a vending machine.
Fig. 3, is a partial vertical section similar to Fig. 2, but looking in the opposite direction.

As will be understood by those skilled in the art, it is impossible that the electromagnet 35 should be energized unless all of the switches 39$^a$, 45$^a$, 47$^a$, 49$^a$, 48$^a$, and one of the two switches 46$^a$, and 50$^a$ are simultaneously closed, and we have so placed, and under operating conditions adjust, the various rods that this condition cannot be fulfilled unless the coin presented is of standard dimension and denomination. If, instead of being standard, it should be a slug of somewhat more than standard thickness, the piece 18, although engaging the rod 47, would not be moved sufficiently to close the switch 47$^a$, formed by the contacts 55 and 56, and if the slug were too thin, the rod 45 would be moved insufficiently to close the switch 45ª. If, on the other hand, the coin was of the proper value but worn more than a predetermined amount, either of the switches 49ª or 45ª would not be closed when the rod 7 was moved to its fullest extent. Again, even though the coin was of standard size but of some nationality other than that for which the machine was designed or adjusted, one or the other of the rods 48, 50, etc., would fail to be moved a sufficient distance, or would be moved when they should not be, so that some of the switches would remain open or would be opened. Even on a coin of the correct denomination and dimensions, one of the switches 46ª and 50ª is always open, and if these are connected in multiple, such opening does not affect the operation of the machine. If, however, the coin is a perfect specimen of the value for which the machine is designed, all of the switches are simultaneously closed when the rod 7 is pushed in to its fullest extent, so that current flows from the battery through said switches and energizes the electro-magnet 35, with the result that the armature 34 is attracted to the core of said magnet and the catch 33 is caused to release the plate 27. As shown in Figs. 2 and 3, the said catch is preferably extended rearwardly out of the casing 1 so that it may actuate or set in operation the mechanism of the machine to which it is attached. Immediately thereafter the weight 32 automatically acts to return the valve 30 to its normal position shown in Fig. 2, so that upon the removal of the pressure from the head 8 and the return of the rod 7 to its normal position under the action of the spring 11, the coin is pushed off of the piece 18 by the ends of the guides 22 and 25, so that it falls into and stays within the casing which is designed to receive perfect coins. If, however, the electro-magnet 35 is not energized, owing to the failure of some of the switches to close or for any other cause, the release of pressure on the rod 7 as before permits the coin to drop, but it is now guided by the valve 30 to the outlet 31 and returned to the person placing it in the machine. It will be understood that in each instance, the various contact rods are adjusted to suit the machine to operate on a coin of predetermined dimensions and value as above noted, the positions of said rods may be varied so that they can be adjusted to suit the machine to be operated by any particular coin.

The machine so far described, is semi-automatic in action, since it is necessary after the coin is dropped into the casing 1 that the rod 7 be pushed into the machine, after which the electro-magnet actuates its armature or remains deënergized and through the devices described governs the path taken by the coin. In some instances, however, it may be advisable to make the machine wholly automatic in action, and in Figs. 10 and 11, I have illustrated mechanism for accomplishing this end. In these figures 80 is a shaft to which is connected a spring, weight or other suitable motor at all times tending to turn said shaft; the apparatus being, as previously described, mounted within a casing, in this instance indicated at 1ª. Said shaft has fixed to it a cam wheel 81, a ratchet wheel 82 and a gear wheel 83, there being a lever 84 so mounted as to extend between the two wheels 81 and 82, and pivoted to a supporting bracket 85 by a spindle 86. This lever has a tooth 87 capable of engaging any one of the teeth of the ratchet wheel which are preferably placed on one side thereof, 90° distant from each other. The face of the wheel 81 adjacent said lever is provided with a number of sidewise-projecting cam faces 88, so designed as to be capable of turning the lever on its pivot spindle so that its tooth 87 may be engaged by one of the teeth of the ratchet wheel. A catch 89 is mounted on the transverse partition 4ª so as to hold the lever 84 against the action of a spring 90 in such position that its teeth may be engaged by the ratchet wheel. This catch is so placed as to be acted on by a lever 91 whose forward end projects in front of and slightly below the plunger 6ª, so that one of its arms is engaged and it is turned on its pivot by a coin as the latter drops into position in front of said plunger. If desired the apparatus shown in Figs. 12 and 13 may be substituted for this catch and lever so that the lever 84 is controlled electrically rather than mechanically. In such case the lever 91ª is engaged by a coin and is so moved as to close a switch, thereby completing the circuit of an electro-magnet 91ᵇ whose armature 89ª releases said lever 84.

The plunger 6ª has connected to it a supporting structure 38ª on which are mounted a series of switches controlled by longitudinally movable contact rods in every way similar to those shown in Figs. 1 to 8 inclusive and previously described. A guide 92 is supported on the partition 4ª so as to suitably carry the plunger 6ª and supporting structure 38ª with their attached parts, so as to permit of their being longitudinally moved within the casing. One arm of a lever 93 is pivoted to the supporting structure 38ª, while its opposite end is pivoted at 94 to a bracket 95 which in turn is pivoted to the partition 4ª by a pin 96. A spring 97 normally holds this bracket in a definite position but permits it to yield slightly under certain conditions of the operation of the lever 93, hereafter noted.

Suitable brackets carried by the partition 4ª provide bearings for a crank spindle 98, the crank of which is journaled in the lever 93 so that when said spindle is turned through one revolution, said lever causes the plunger 6ª and the supporting structure 38ª to be moved longitudinally to the rear and then returned to their normal positions. For the purpose of so actuating this spindle it is provided with a pinion 99 meshing with a gear wheel 83, and in addition there is also fixed to it a second pinion 100 connected through the gear wheel 101 to a spindle 102 on a governor shaft 103. On this latter is mounted any suitable form of centrifugal governing device for moving a disk 104 longitudinally of the shaft so as to cause it to press upon the ends 105 of a rearwardly projecting branched arm 106 of the lever 84. In the present instance this governor device consists of a pair of spring strips 107 each having mounted on it a weight 108, and while these strips are fixed at one end the arrangement is such that when said weights fly out under the action of centrifugal force, the disk 104, which is connected to their opposite ends, is drawn toward and caused to press against the ends 105 of the lever arm 106. In addition to the above mechanism, this form of my device may contain a supporting structure 38 with all of the various switches mounted thereon as heretofore noted in connection with the semi-automatic form of our invention, there being, as before, a swinging valve 30 controlled by an electro-magnet 35 which is connected in series with the switches of the set carried by the structure 38 as well as those of the structure 38ª.

Under operating conditions, a coin dropped into the casing 1ª comes to rest in front of the plunger 6ª and in so doing turns the lever 91 on its pivot. This lever trips the catch 89 either mechanically or electrically as heretofore noted and releases the lever 84, which, under the action of the spring 90, is swung toward the cam wheel 81, taking its tooth 87 out of engagement with the tooth of the ratchet wheel. The spring or other motor connected to the shaft 80 (and which is omitted from the present drawings) is then free to turn said shaft and in so doing turns the crank shaft 98 through the gears 83 and 99. The amount of this turning, however, is limited to one revolution of said crank shaft, since the teeth of the ratchet wheel 82 are so placed as to permit just the necessary revolution of the shaft 80 before one of them is again engaged by the tooth 87. Such engagement is due to the fact that one of the cams 88 on the wheel 81 comes into engagement with the wheel 84 as the shaft 80 turns and forces it, against the action of the spring 90, into such position that the tooth of the ratchet wheel necessarily comes into engagement with the tooth 87 of said lever. In order that these operations may take place at the proper speed and the various parts be properly brought to rest at the end of one revolution of the crank shaft 98, the shaft 103 is driven, as above described, from said crank shaft, and its motion causes the governor to so act that the disk 104 is pressed against the lever arm 106, thus not only retarding the shaft 80 through the cam wheel 81, but also retarding the revolution of the governor shaft itself by a predetermined amount.

As above noted, the full revolution of the crank shaft 98 causes the rearward and subsequent forward movement of the plunger 6ª with its attached parts, so that a coin is carried to the rear, acted on by the two sets of longitudinally movable switch controlling rods, and, on the forward movement of the plunger 6ª, is released so as to either fall out of the machine through a guide channel 109 if spurious or worn, or on the other hand, be retained in the machine, if it is standard. If the coin should be so thick as to prevent the plunger 6ª making a full stroke, the spring 97 allows the supporting bracket 95 to yield sufficiently to prevent injury to the machine. In order to prevent malicious clogging of the machine by means of paper, foreign materials or the like, we preferably mount on the casing 1ª a coin guiding device 110 which consists of a small casing having a slot 111 at the top, which is not directly connected with the slot 17ª of the casing 1ª. Instead there is provided in the opposite sides of this casing 110 two curved tracks 110ª of channel shaped section whose flanges are of relatively small height, so that when a coin of standard diameter is introduced through the opening 111, it is directed by these tracks (which engage opposite points of its edges) so that it falls in the proper position into the opening 17ª. Said tracks are preferably reversibly curved, and the opening 111 is so placed as to not be directly over the opening 17ª. With such an arrangement of parts, it is obvious that foreign articles other than coins placed or forced into the opening 111 cannot reach the opening 17ª but would drop into the space to the rear of it, from which they can be removed in any desired manner. It is of course obvious that we may employ the two sets of longitudinally movable rods simultaneously engaging opposite faces of a coin and each controlling a number of switches, in other combinations than those shown in Figs. 10 and 11. That is to say, the plunger 6ª with its rods and switches may be moved with a coin toward the rods and switches carried by the structure 38 in the manner shown in Fig. 2 instead of by the means illustrated in Figs. 10 and 11.

Figures 10, 12, 13:
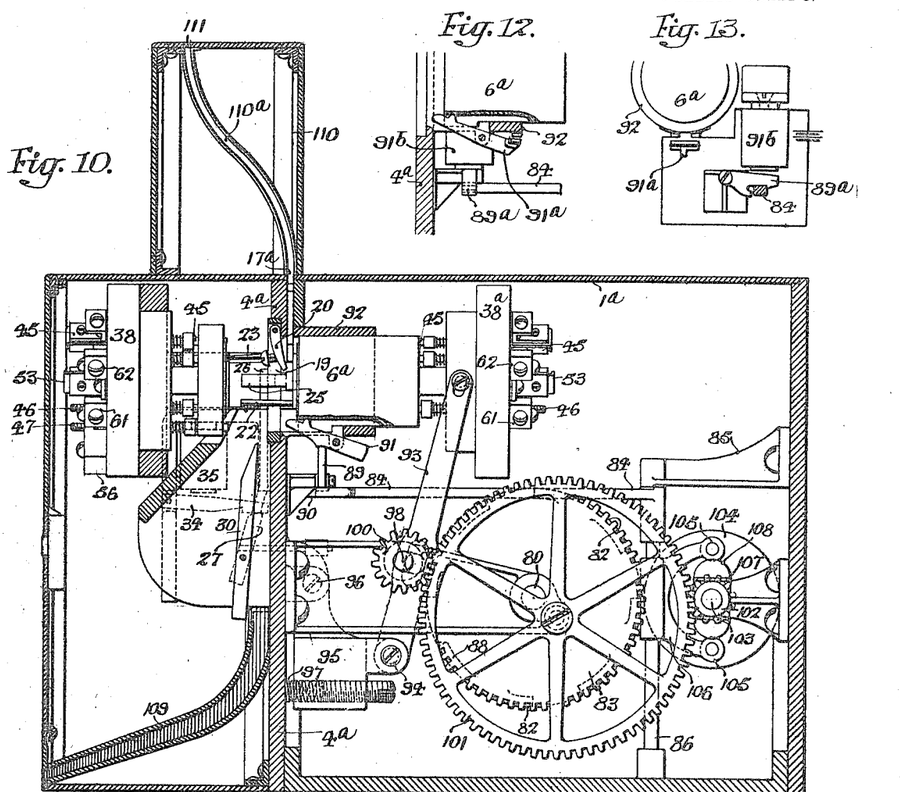
Figs. 10 and 11 are respectively a vertical section and a plan of an automatic form of our invention, which, however, embodies the main features of the device shown in Figs. 1 to 8 inclusive.
Figs. 12 and 13 are two elevations of a modified form of the releasing means for the automatic form of our machine.
Figure 11:
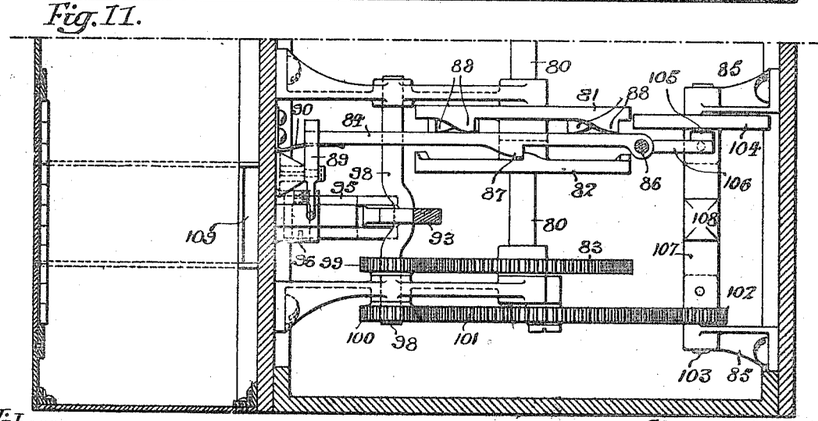

From Fig. 13 it will be noted that the armature 89ª, in addition to possessing an offset for engaging the lever 84, has a projecting finger 89ᵇ so placed that after said lever has been released by this offset, said finger forcibly strikes it and materially assists the spring 90 in disengaging it from the ratchet wheel 82. This same construction is preferably employed for the part 89 of Figs. 10 and 11.

We claim:—

1. The combination in a coin selector of coin directing means, and electrically controlled mechanism depending for its operation upon differences in the thickness of the parts of a coin, for governing said means.

2. The combination in a coin selector of coin directing means, an electromagnet controlling said means, a switch and a source of current in circuit with said magnet, and means depending for its action upon differences in the thickness of the parts of a coin, for governing the operation of said switch.

3. The combination in a coin selector of a valve, an electromagnet controlling said valve, a switch and a source of current in circuit with said magnet, means depending for its operation upon variations in the thickness of a coin for controlling said switch, and a device for presenting a coin to said latter means.

4. The combination in a coin selector, of a valve, an electromagnet controlling said valve, a switch and a source of current in circuit with said magnet, means depending for its operation upon variations in the thickness of the coin, and an automatically acting device for presenting a coin to said latter means.

5. The combination in a coin selector of a series of members mounted to be capable of engaging different points on the face of a coin, means for presenting a coin to said members, a switch controlled by said members, and electrically actuated mechanism in circuit with said switch for determining the path of a coin after it has been released from engagement with said members.

6. The combination in a coin selector of a series of members mounted to be capable of engaging different points on the face of a coin, means for presenting a coin to said members, a switch controlled by said members, an electromagnet in circuit with said switch, and a coin-directing valve controlled by said magnet.

7. The combination in a coin selector of a longitudinally movable rod, means for presenting a coin to said rod, a switch controlled by the rod, a magnet and a source of current in circuit with the switch, and a coin directing device controlled by the magnet.

8. The combination in a coin selector of a normally open switch, electrically governed coin directing means controlled by said switch, and mechanism constructed to cause closing of said switch only when a standard coin is presented thereto.

9. The combination in a coin selector of a series of switches of which certain are normally closed and others are normally open, means operated solely by a standard coin for closing the open switches without opening the closed switches, and electrically governed coin-directing means in circuit with said switches.

10. The combination of a coin-engaging member, a switch controlled by the same, means for presenting a coin to said member and subsequently releasing it therefrom, with electrically governed coin directing means in circuit with said switch for separating spurious from standard coins after their release.

11. The combination in a coin selector of a switch having a member capable of engaging the face of a coin, a plunger for presenting a coin to said member and subsequently releasing it, a valve for separating spurious from standard coins, and an electro-magnet in circuit with said switch for controlling said valve.

12. The combination in a coin selector of a switch having a coin engaging member, an electromagnet and a source of current in circuit with said switch, a coin directing valve, a catch controlled by the armature of the magnet for holding the valve in a predetermined position, with means for presenting a coin to the switch member and simultaneously moving the valve from its normal position into said predetermined position.

13. The combination in a coin selector of a plurality of spring supported rods, switches controlled by said rods, a plunger for presenting the face of a coin to said rods, means for maintaining a coin in a definite position while it is being presented by the plunger to said rods, an electro-magnet and a source of current in circuit with the switches, and coin directing means controlled by said magnet.

14. The combination in a coin selector of a series of switches, a series of members controlling said switches and designed to be actuated by a coin, means for presenting a coin to the said members, means for adjusting said parts to vary the amount of movement necessary to cause operation of the switches, an electro-magnet and source of current in circuit with the switches, and coin directing means controlled by said electro-magnet.

15. The combination in a coin selector of two series of switches each having a series of coin engaging members, means for supporting said two series of members so that they are capable of operating on opposite faces of a coin, an electro-magnet and a source of current in circuit with the switches, means for presenting a coin to said switch-controlling members, and coin directing means governed by said electro-magnet.

16. The combination in a coin selector of two series of coin engaging members, means for fixedly supporting one of said series of members, a movable structure for supporting the members of the other series, coin directing means jointly controlled by said members, and means for moving one of said series of members to bring a coin into operative position.

17. The combination in a coin selector of a casing, electrically controlled mechanism including a coin actuated switch within the casing for separating spurious from standard coins, and a source of current for actuating said mechanism.

18. The combination of a casing having a coin inlet, means in the casing for separating spurious from standard coins, and a coin guideway having an inlet out of line with the inlet of the casing and connected thereto by relatively narrow tracks, said tracks being placed on opposite sides of the guideway and being formed to engage limited portions of opposite sides of a coin.

19. The combination in a coin selector of a casing, mechanism within the casing for separating spurious from standard coins, and a member actuated from said mechanism only when a standard coin is presented to the machine, for actuating a vending device.

20. The combination in a coin selector of a casing and electrically controlled mechanism within the casing for separating spurious from standard coins, said mechanism including an electro-magnet, and means for causing energization of said magnet only when a standard coin is presented to the machine, with a member actuated by said magnet for controlling the operation of a vending machine.

21. The combination in a coin selector of a relatively fixed member and a movable member, an electric switch placed to be controlled by said movable member, means for presenting a coin to said member, and coin directing means including an electro-magnet in circuit with the switch or switches for separating the standard coins from others after they have been presented to said member.

22. The combination in a coin selector of a switch, a movable plunger, a structure having guiding means for directing a coin in front of said plunger, coin engaging members for actuating said switch and means for holding the coin in a predetermined position while it is being moved by the plunger into engagement with said members, with coin directing means controlled by said switch for separating standard coins from others.

In testimony whereof, we have signed our names to this specification in the presence of two subscribing witnesses.

GEORGE C. REITH.
GEORGE F. FLADE.

Witnesses:
WILLIAM E. BRADLEY,
WM. A. BARR.